(12) United States Patent
Luo et al.

(10) Patent No.: US 12,658,069 B2
(45) Date of Patent: Jun. 16, 2026

(54) PROGRAMMABLE GAMING CARD

(71) Applicant: Xiaoju Geng, Shanghai (CN)

(72) Inventors: Xinyuan Luo, Shanghai (CN); Xiaoju Geng, Shanghai (CN)

(73) Assignee: Xiaoju Geng, Shanghai (CN)

( * ) Notice: Subject to any disclaimer, the term of this patent is extended or adjusted under 35 U.S.C. 154(b) by 448 days.

(21) Appl. No.: 18/036,889

(22) PCT Filed: Jan. 11, 2021

(86) PCT No.: PCT/CN2021/071071
§ 371 (c)(1),
(2) Date: May 15, 2023

(87) PCT Pub. No.: WO2022/099920
PCT Pub. Date: May 19, 2022

(65) Prior Publication Data
US 2023/0419858 A1    Dec. 28, 2023

(30) Foreign Application Priority Data
Nov. 13, 2020    (CN) .......................... 202011269165.0

(51) Int. Cl.
G09B 19/00        (2006.01)

(52) U.S. Cl.
CPC ................................ G09B 19/0053 (2013.01)

(58) Field of Classification Search
CPC ....... G09B 19/00; G09B 19/0053; A63F 3/00; A63F 3/00529; A63F 13/822; G07F 17/32; G07F 17/3293
See application file for complete search history.

(56) References Cited

U.S. PATENT DOCUMENTS

| | | | |
|---|---|---|---|
| 8,678,392 B1 * | 3/2014 | Alhazza | ..................... A63F 1/04 |
| | | | 273/299 |
| 11,786,804 B2 * | 10/2023 | Peterson | ............. A63F 3/00148 |
| | | | 273/239 |
| 2006/0082060 A1 * | 4/2006 | Soto | ..................... A63F 3/00138 |
| | | | 273/242 |
| 2020/0129853 A1 * | 4/2020 | Roudy | ..................... A63F 13/25 |

FOREIGN PATENT DOCUMENTS

CN            107149768 A        9/2017

* cited by examiner

*Primary Examiner* — Omkar A Deodhar
(74) *Attorney, Agent, or Firm* — Jose Cherson Weissbrot

(57)        ABSTRACT

This invention discloses a programmable game card comprising a basic rule board and one or more different types of game cards. The basic rule board comprises a basic rule mainboard and a plurality of basic rule sub-boards, wherein the plurality of basic rule sub-boards are detachably connected to the basic rule mainboard in a shape-matching manner, and each of the basic rule sub-boards records a rule of the game, and the one or more different types of game cards comprise event cards. The event card comprises a direct execution event card, a conditional execution event card, and/or a loop execution event card. This application can not only educate children on programming during the game but also embody the novel ideas of children during the game in the rules of the card.

10 Claims, 3 Drawing Sheets

PROGRAMMABLE GAMING CARD

TECHNICAL FIELD

This application relates to a gaining card, in particular to a programmable gaining card.

BACKGROUND

With the development of computer technology, computer basic programming education for children is also increasingly popular. However, current basic programming education requires the help of a computer or similar electronic products, which leads to high education costs. On the other hand, electronic products also easily lead to vision loss in children. Moreover, children's exposure to electronic devices can easily lead to addiction, which in turn results in a decrease in attention toward non-electronic educational environment.

However, basic programming education can greatly promote the development of children's mathematical and logical thinking, and personal programming skills are also likely to become a universal skill in the future, similar to language skills. It is inadvisable to abandon basic programming education due to the side effects of electronic products.

There is a need for a new mode of basic programming education, which can complete the basic programming education for children without the help of electronic products.

Children also have tabletop card games without the help of electronic products. However, in the existing card games, the rules of the game and the content of the cards are fixed. After becoming familiar with a set of playing cards, children often lose interest therein. Additionally, children often have their own ideas about how to play a game, but such ideas cannot be reflected in traditional card games.

SUMMARY

This application provides a novel programmable gaining card that not only allows children to receive programming education during the game process but also enables them to incorporate their novel ideas into the rules of the game card, to achieve the goal of combining education with fun.

Another advantage of this application is that it does not require multiple players to play card games, but only one player is required to play. This is particularly suitable for certain special conditions. For example, in the case of a long-term fight against COVID-19, the application is very conducive to children playing at home by themselves, and there is no need to worry about their eyesight after too much exposure to electronic products.

In one main aspect of the application it is provided a programmable gaining card comprising a basic rule board and one or more different types of game cards, wherein the basic rule board comprises a basic rule mainboard and a plurality of basic rule sub-boards, wherein the plurality of the basic rule sub-boards are detachably connected to the basic rule mainboard in a shape-matching manner, and each of the basic rule sub-boards records a rule of the game;

wherein the one or more different types of game cards comprise event cards, the event card comprises a direct execution event card, a conditional execution event card, and/or a loop execution event card;

wherein the direct execution event card comprises an execution portion, the execution portion that describes an action to be executed;

wherein the conditional execution event card comprises a condition portion and the execution portion, and the condition portion and the execution portion are designed to be detachably connected together in a shape-matching manner, the condition portion that describes a condition for executing an action;

wherein the loop execution event card includes a loop portion and the execution portion, and the loop portion and the execution portion are designed to be detachably connected together in a shape-matching manner, the loop portion that describes the number of times or a condition for executing an action in the loop.

Preferably, the plurality of the basic rule sub-boards have a plurality of levels, including at least a primary sub-board and a secondary sub-board, the secondary sub-board being a sub-board of the primary sub-board.

Preferably, the direct execution event card further comprises a foreshadowing portion, the foreshadowing portion uses more language to describe the event or develop a storyline to increase the fun of the game; wherein the foreshadowing portion is designed integrally with the execution portion or is designed to be detachably connected together in a shape-matching manner.

Preferably, the condition portion is designed with an outwardly convex arrow shape, and the execution portion is designed with a concave portion matching the arrow shape, thereby connecting the two portions together.

Preferably, the execution portion is designed to be divided into upper and lower portions, if the condition is achieved, the upper portion will be executed, and if it is not achieved, the lower portion will be executed; and the upper portion and lower portion are respectively engaged to the two sides of the arrow of the condition portion.

Preferably, the loop portion is designed as a bounding or semi-bounding box, and the execution portion is designed as a card that can be embedded in the box.

Preferably, the one or more different types of game cards further comprise a character card, and the character card comprises a character main portion, at least one parameter portion describing a parameter of the game, and at least one value portion describing a parameter value, both the parameter portion and the value portion being designed to be detachably embedded in the character card.

Preferably, the one or more different types of game cards further comprise a prop card, the prop card comprises a prop main portion, at least the one parameter portion describing a parameter of the game, and at least the one value portion describing a parameter value, both the parameter portion and the value portion being designed to be detachably embedded in the prop card.

Preferably, the character card and the prop card are designed to be detachably connected together in a shape-matching manner.

Preferably, at least one protrusion is designed on the character card, and a recess matching the protrusion is designed on the prop card for connection of the character card to the prop card.

Preferably, at least one the protrusion of the character card may be designed as a hand or a foot of the character, and the corresponding prop card is designed as a prop matching the hand or foot.

Preferably, the one or more different types of game cards further comprise a skill card, the skill card comprises a skill main portion, at least one the parameter portion describing a parameter of the game, and at least one the value portion describing a parameter value, both the parameter portion and the value portion are designed to be detachably embedded in the skill card.

Preferably, the skill card further comprises the condition portion and the execution portion, the condition portion and the execution portion being designed to be detachably connected together in a shape-matching manner.

Preferably, the character card and the skill card are designed to be detachably connected together in a shape-matching manner.

Preferably, the game parameters include character attributes, and the parameter values comprise attribute values.

Preferably, the parameter portion is designed in the form of a parameter mini-card, and is embedded in the one or more different types of game cards in a detachable and replaceable manner.

Preferably, the value portion is designed in the form of a value mini-card, and is embedded in the one or more different types of game cards in a detachable and replaceable manner.

Preferably, the parameter mini-card and the value mini-card have a different shape and/or a different color.

Preferably, and a skill mini-card with the name of the skill may also be set in the character card, the skill mini-card is embedded in the character card in a detachable and replaceable manner.

Preferably, the programmable gaining card further comprises a game map board comprising a plurality of map blocks and connectors connecting the map blocks, the map block and the connector being designed to be detachably connected together in a shape-matching manner to form a map.

Preferably, the map blocks are square or regular hexagonal or circular.

Preferably, the map blocks are designed to comprise multiple types of map element blocks, each type of map element has a different shape, size or color, to distinguish different map elements.

Preferably, the concave-convex structure for mating with the connector is uniform on multiple of types of the map element blocks.

Preferably, the connector is provided with an arrow mark for indicating the direction of advancement on the map during the game.

Preferably, the map is designed in the form of a fork in the road.

Preferably, the game rules comprise a conditional statement and a selection statement for selecting a fork in the road on the map.

Preferably, the basic rule sub-board comprises the condition portion for describing the conditional statement and the execution portion for describing the selection statement, the condition portion and the execution portion being designed to be detachably connected together in a shape-matching manner.

Preferably, the basic rules further include a loop statement. The basic rule sub-board further comprises the loop portion for describing the loop statement, the loop portion and the execution portion being designed to be detachably connected together in a shape-matching manner.

Preferably, the one or more different types of game cards further comprise a map card, the map card describing the map elements.

Preferably, the map elements comprise terrain, events and/or enemies.

BRIEF DESCRIPTION OF THE DRAWINGS

The above summary and the following detailed description will be better understood by reading in conjunction with the drawings. For ease of description, certain embodiments of this application are shown in the drawings. However, it should be understood that this invention is not limited to the precise arrangements and tools shown. The accompanying drawings that form part of this specification, together with this description serve to illustrate the advantages and principles of the invention.

Wherein.

EMBODIMENTS

Figure 1:
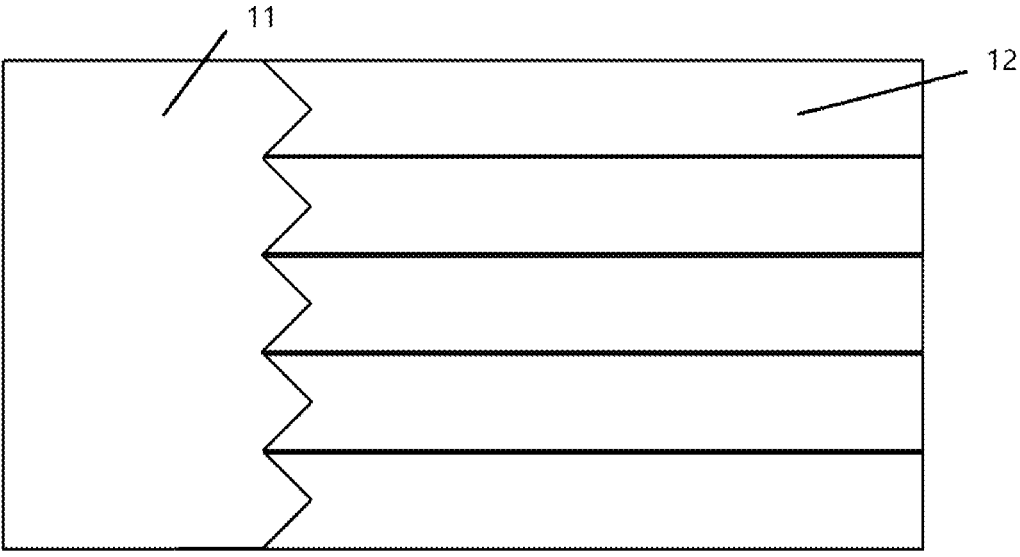
FIG. 1 illustrates a basic rule board for programmable cards according to one preferred embodiment of this application.

Before describing at least one embodiment of the application in detail, it is to be understood that this application is not limited to the details of the construction and arrangement of components proposed in the following description or shown in the accompanying drawings. The drawings and the written description are provided to instruct technicians in the art in conducting and using the application for which patent protection is sought. This application is applicable to other embodiments and can be implemented and carried out in various ways. Technicians in the art will understand that not all features of a commercial embodiment are illustrated for clarity and ease of understanding.

In addition, it is to be understood that the words and terminology used herein are for ease of description and should not be considered a limitation. For example, the use of singular terms such as "one," or "a," is not intended to limit the number of items. In addition, the use of non-restrictive relational terms such as "top", "bottom", "left", "right", "up", "down", "down", "up", "side" is specifically referred to in the accompanying drawings for clarity in this description, rather than intended to limit the scope of this application or the accompanying claims. Moreover, it is to be understood that any one of the features of this application can be used alone or in combination with other features. Other systems, methods, features and advantages of this application will become apparent to technicians in the art upon reading the drawings and detailed description. All such other systems, methods, features and advantages are contemplated to be included within this description, be included within the scope of this application, and be protected by the appended claims.

Reference will now be made in detail to an implementation of this application as illustrated in the drawings.

In the preferred embodiment of this application, the programmable cards comprise a basic rule board, a game map board and one or more different types of game cards.

FIG. 1 shows a basic rule board for programmable cards according to one preferred embodiment of this application. As shown in the drawing, the basic rule board includes a basic rule mainboard 11 and a plurality of basic rule sub-boards 12. The basic rule mainboard 11 is roughly longitudinally arranged, and has a zigzag structure on its right side. Each of the basic rule sub-boards 12 is roughly horizontally arranged, with a concave portion on its left side that can receive exactly one of the zigzag teeth of the zigzag structure of the basic rule mainboard 11. It should be understood that as long as the basic rule sub-boards can be detachably connected to the basic rule mainboard in a shape-matching manner, the purpose of this application can be achieved. For example, the right side of the basic rules mainboard may not have a zigzag structure, but may have a concave portion at regular intervals, and the basic rule sub-board just has a corresponding convex portion capable of being stuck on the basic rules mainboard. For another example, the basic rule mainboard may also be roughly horizontal rather than longitudinally oriented and has a concave-convex structure on its upper portion, while the basic rule sub-board is roughly longitudinally oriented with a corresponding concave-convex structure on its lower portion so as to be embedded on the basic rule mainboard. For another example, the basic rule mainboard may be set in the shape of a trunk, and the basic rule sub-board may be set in the shape of a branch.

It is to be understood that, although each of the basic rule sub-boards is connected to the basic rule mainboard in the above embodiments, in other embodiments, only a part of the basic rule sub-boards may be connected to the basic rule mainboard, and another part of the basic rule sub-boards may be connected to other basic rule sub-boards only. Of course, the basic rule sub-boards may also be designed in multiple levels, for example, two levels, such that the primary sub-board serves as a sub-board of the mainboard, and the secondary sub-board serves as a sub-board of the primary sub-board.

Each basic rule sub-board records a rule of the game. Preferably, one or more rules of the game are also recorded on the basic rule mainboard. Since the basic rule sub-boards are detachably connected to the basic rule mainboard, preferably, each basic rule sub-board may be replaced with another basic rule sub-board, which then generates new rules of the game.

In a preferred embodiment of this application, the game map board comprises a plurality of map blocks and connectors connecting the map blocks. Preferably, the map blocks have at least one concave portion thereon, and the connector has at least two convex portions for respectively connecting the concave portions of different map blocks. Of course, it will be understood that the map blocks may also have convex portions and the connector may have corresponding concave portions. These map blocks are roughly preferred to be square or other shapes, such as regular hexagons or circles. The map blocks may be designed into blocks with multiple types, each type with different shape, size or color, to distinguish different map units. In order to match different types of map blocks, various types of connectors can be used. However, preferably, the concave-convex structure used for matching connectors on multiple types of map blocks is uniform, so that only one connector needs to be used.

The connector is preferably provided with an arrow mark, and when the connector connects two or more map blocks, the arrow mark may indicate from which map block player should move to which map block in the game, that is, may indicate the advancing direction of the player on the map during the game.

Figure 2A:
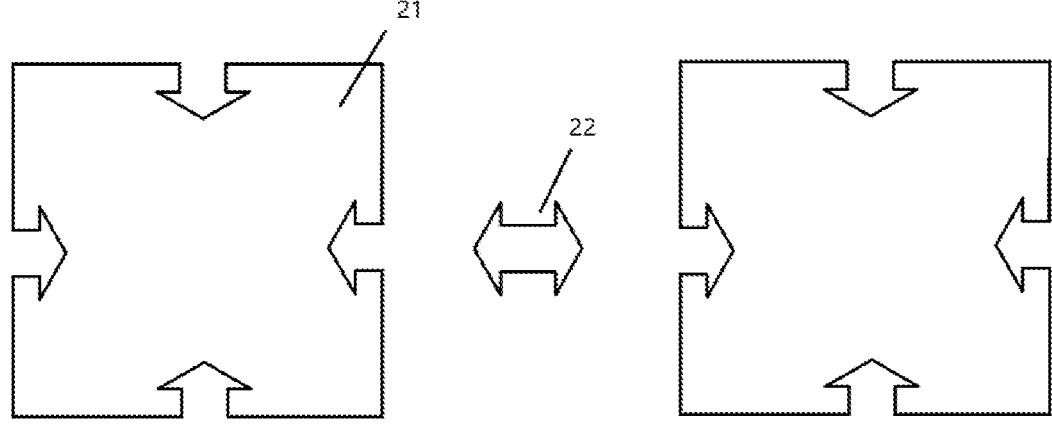
FIG. 2a schematically illustrates a form in which the map blocks and the connector are separated according to one preferred embodiment of this invention.
Figure 2B:
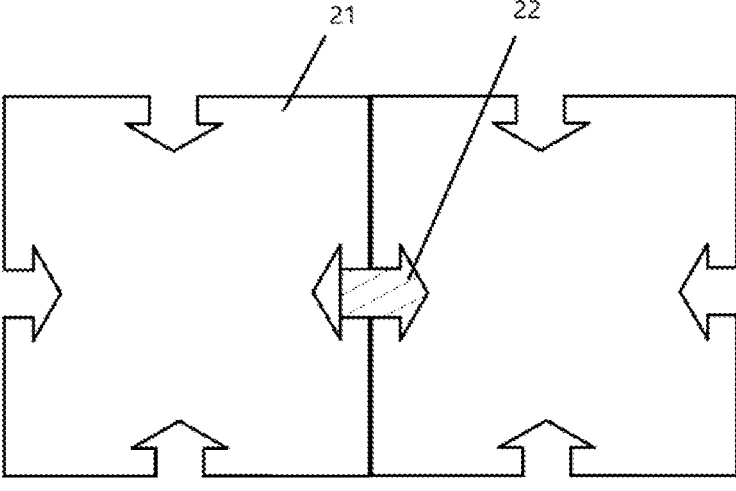
FIG. 2b schematically illustrates a form in which the connector connects the map blocks according to the preferred embodiment.

FIG. 2a schematically shows a form in which the map blocks and the connector are separated according to a preferred embodiment of this invention. FIG. 2b schematically shows a form in which the connector connects the map blocks according to the preferred embodiment. Among them, the map block 21 is square, and has an arrow-shaped concave portion on each of its four sides. The connector 22 is in the shape of a double arrow, and may be embedded in two map blocks to connect them. One side of the connector 22 may be colored only on an arrow portion (as shown by a shaded portion in the figure), so that the advancing direction may be clearly indicated.

It should be understood that the map blocks may be directly connected together without the connector. The advancing direction of the map may be directly obtained from the shape of the map after connecting (for example, a map that advances in sequence), or may be specified by the player.

For the map, preferably, the selection of forks in the road may also be added. Different advancing directions may be indicated by different arrow connectors. For the selection of forks in the road, conditional judgment and selection statements may be added to the basic rule board portion, for example, designed as a basic rule sub-board. For a basic rule sub-board with conditional judgment statements and selection statements, it may be designed as a condition portion (containing the conditional judgment statements) and an execution portion (containing the selection statements), and the condition portion and the execution portion may be designed to be detachably connected together in a shape-matching manner. If in some embodiments, the basic rule sub-board has loop statements (such as loop times, loop conditions, etc.), the components may be designed as a loop portion (containing the loop statements) and an execution portion, and the loop portion and the execution portion may also be designed to be detachably connected together in a shape-matching manner. Preferably, the execution portion may be replaced by another execution portion, which is equivalent to changing the rules of the game. Of course, replacing the condition portion or the loop portion is also possible.

It should also be understood that, in some embodiments, the game map board may not be required. This can be done, for example, by canceling game map boards and map blocks and replacing map blocks with map cards. It may also be, for example, that even the map cards are not required, that is, no map elements need to appear in the game.

As described above, the programmable cards of this application comprise one or more different types of game cards. These types of game cards may comprise, for example, map cards, event cards, character cards, prop cards, skill cards, etc. It should be understood that the classification and names of these card types can be determined based on different game methods or rules, and do not affect the spirit and scope of this application. It should be understood that the instructions on these cards may also form portion of the rules of the game. Therefore, the aforementioned rule board is called a "basic" rule board.

These game cards will be described by way of example in the following.

Map cards, as described above, may replace the map blocks. Map cards may have map elements, which may tell the player what kind of scene he or she has encountered, such as a certain terrain, a certain event, a certain enemy, etc.; and according to the scene on the map elements, the corresponding game cards are invoked.

Event cards can tell players what events are currently happening. Overall, events can be divided into events that are beneficial to the player and events that are unfavorable to the player. Or even without distinguishing whether events are beneficial to the player, they usually affect the values of some game attributes of the player's game characters. These game attributes may be, such as money, hit points, etc. Event cards usually provide a certain narrative of events, and then require a certain action to be performed, or a judgment to be made and then an action to be performed, or an action to be performed until a certain condition is met, or an action to be performed a certain number of times. For example, an event may be, "If player A's money is greater than 2000, subtract his money by 100," or "Restore player A's hit point by 1," or "Advance 1 space each time until Player A rolls 6," or "Player A attacks 3 times in a row." Making a judgment may involve calculating the value of a parameter, performing an action may also involve adjusting the value of the parameter. Here, the parameter may be, for example, "Space", "Time" in the previous example, or it may be, such as "Money", "Hit point" in the previous example—in some forms of game play, these parameters may also be referred to as "attributes."

In a preferred embodiment of this application, the value portion of the event card is designed in the form of a mini-card embedded in the event card, and the value is recorded on the mini-card. There can be many value mini-cards, including values between 0 and 9, or any value suitable for the game. And each value may appear multiple times, especially for values that appear frequently in the game, there may be a plurality of value mini-cards to record the value. The value mini-cards in the event card may be replaced. Thus, in the game, in addition to the pre-designed values by the game designer, the player may also put the values he or she considers appropriate in the event card.

Preferably, the parameter portion (especially the parameter "attributes") in the event card is also designed in the form of a mini-card embedded in the event card. Such parameter mini-cards may also be replaced in the event card. Thus, in the game, in addition to the pre-designed values by the game designer, the player may also put the values he or she considers appropriate in the event card. Of course, the parameter mini-cards and the value mini-cards may be designed in different shapes or colors.

Figure 3:
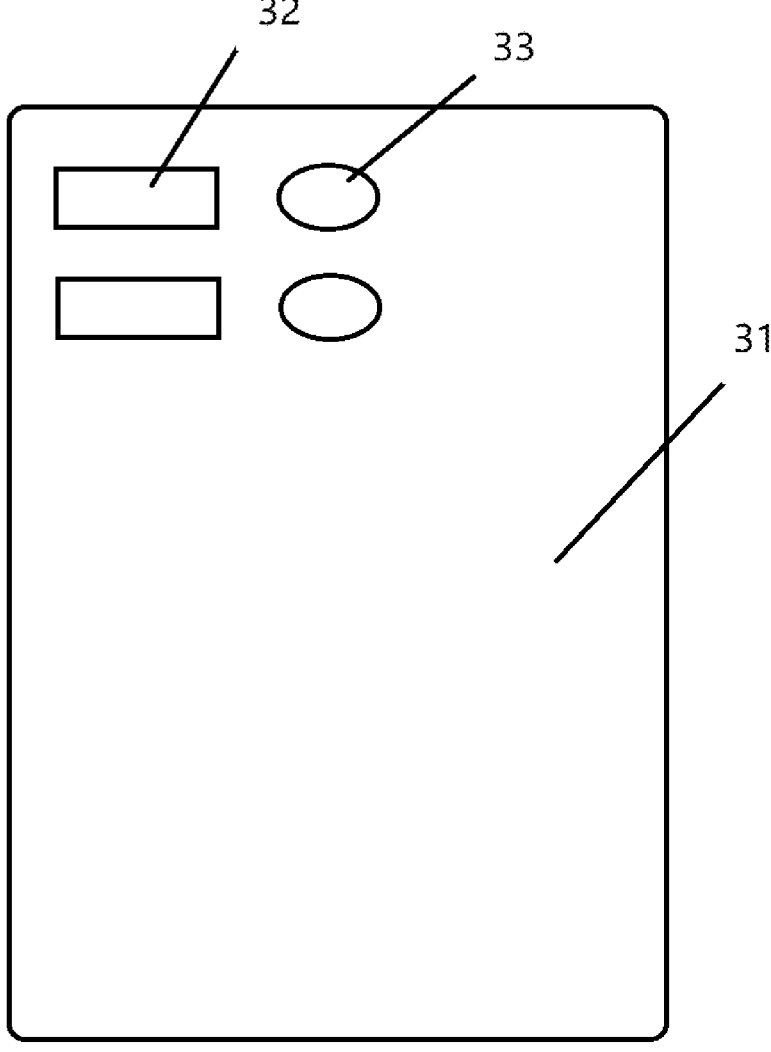
FIG. 3 schematically illustrates an event card according to one embodiment of this invention.

FIG. 3 schematically shows an event card according to one embodiment of this invention. Two parameter mini-cards 32 and two value mini-cards 33 are respectively embedded in the event card 31. The parameter mini-card 32 is roughly rectangular, and the value mini-card 33 is roughly elliptical. Both are easily taken out from the event card 31 and replaced with same kind mini-card, which is then embedded into the event card. Although not shown in the drawing, it should be understood that the two parameter mini-cards 32 may have different colors to help the player quickly distinguish different parameters, and the colors of the two value mini-cards 33 may follow the colors of the corresponding parameter mini-cards 32. Of course, the value mini-cards 33 to use their own color system is also possible, for example, dark colors for high values and light colors for low values.

As the way of executing actions, the event card may be classified into a direct execution type, a conditional execution type, and a loop execution type, and of course, it may also have other types and mixed types. Preferably, event cards with different structures are designed according to different execution types. For example, for an event card with a condition, the condition portion (including the conditional judgment statement) and the execution portion (including the execution statement) may be designed to be detachably connected together in a shape-matching manner. More specifically, for example, for an event card with the condition judgment preceding and the action execution following, the condition portion may be designed to have an outwardly convex arrow shape, and the execution portion may be designed to have a concave portion matching the arrow shape, thereby connecting the two portions together. If the condition portion has an action to be executed regardless of whether the condition portion is reached or not, the execution portion may be designed to have upper and lower portions. If the condition is achieved, the upper portion will be executed, and if it is not achieved, the lower portion will be executed. And the upper and lower portions may be designed to engage the two sides of the arrow of the condition portion, respectively. For another example, for an event card with loop execution, the loop portion (including the loop statement) and the execution portion may be designed to be detachably connected together in a shape-matching manner. Specifically, for example, the loop portion may be designed as a bounding or semi-bounding box, and the execution portion may be designed as a card that may be embedded in the bounding box. For the direct execution event card, they can be designed as a foreshadowing portion (including a foreshadowing statement) and an execution portion (of course, the two portions may also be designed as a whole), and the foreshadowing portion and the execution portion may be designed to be detachably connected together in a shape-matching manner. More specifically, the connection manner between the condition portion and the execution portion of the conditional execution event card can be referred to. Preferably, the foreshadowing portion may describe the event in more words, or expand the storyline to increase the fun of the game; of course, it is feasible to write nothing at all. For event cards of mixed types, of course, the corresponding portions may be designed according to the mixed types by referring to the aforementioned scheme.

Of course, in some implementations, a card body frame may also be designed for the event card. The above condition portions, execution portions, loop portions, foreshadowing portions, etc. can all be designed in the form of cards that can be detachably embedded in the card body frame. Preferably, the connection design between the condition portion, the execution portion, the loop portion, and the foreshadowing portion may also refer to the above forms.

Further, optionally, each of these condition portion, execution portion, loop portion, and foreshadowing portion may be replaced with another condition portion, execution portion, loop portion, or foreshadowing portion, respectively. This is equivalent to changing the event card.

Players usually also use character cards. For the character card, it usually has some attributes, such as the above-mentioned hit point, money, and so on. For some combat games, the character can also be designed to have skills; of course, to increase the fun of the game, it is also possible to design "spirit points" (or "magic points", or "skill points") to control the use of skills, so that there is an extra attribute. In short, the character card can have attributes, and the attributes can also have values. Referring to the manner described above, both the attribute portion and the value portion in the character card may be designed in the form of replaceable mini-cards which may be detachably embedded in the character card. The character card is also called the role card in some games, but in some games they will also be distinguished from the character card. It is to be understood that they are not different within the spirit and scope of this application.

Prop cards are usually used to change the attributes of the character, which can cause an increase or decrease in the value of the character's attributes. In the explanation content of the prop card, there will also be an attribute portion and a value portion. Preferably, also referring to the manner described above, both the attribute portion and the value portion in the prop card are designed in the form of replaceable mini-cards which may be detachably embedded in the character card. In addition, the prop card is also called the accoutrement card or the equipment card in some games, but in some games the prop card will also be distinguished from the accoutrement card or the equipment card. It is to be understood that they are not different within the spirit and scope of this application.

Skill cards are usually used to change the attributes of the character through certain actions, which can cause an increase or decrease in the value of the character's attributes. In the explanation content of the skill card, there will also be an attribute portion and a value portion. Preferably, also referring to the manner described above, both the attribute portion and the value portion in the skill card are designed in the form of replaceable mini-cards which may be detachably embedded in the character card. In addition, the skill card is also designed to be triggered when certain conditions are met in some games, so it may comprise a condition portion and an execution portion, which is similar to the event card. In a preferred embodiment, the condition portion and the execution portion of the skill card are also designed to be detachably connected together in a shape-matching form. It is to be understood that if the skill card also includes a loop portion, and a foreshadowing portion, the involved form can also refer to the design form of the above event card, including the design form of the card body frame, which can also be used for reference. In addition, the skill card is also called the function card or the magic card in some games, but in some games the skill card will also be distinguished from the function card or the magic card. It is to be understood that they are not different within the spirit and scope of this application.

It is to be noted that in some games, the prop card is also designed to function like the skill card, which may also include a condition portion, a execution portion, a loop portion, a foreshadowing portion, the card body frame, etc. This kind of prop card can be regarded as a skill card, and can also be designed referring to the above form.

Of course, the prop card and the skill card are also designed in some games to change game parameters (in which case the parameter may not necessarily be a character's attribute), causing an increase or decrease in the value of the parameter. In this sense, the attribute portions of the prop card and the skill card can be collectively referred to as the parameter portion.

In addition, the prop is often equipped on the character in the game. Therefore, in order to reflect the relationship between the prop and the character, in a preferred embodiment of this application, the character card and the prop card are provided to be detachably connected together in a shape-matching form. For example, according to the kind or number of props that the character can be equipped with, a certain number of protrusions are designed on the character card, and a corresponding number of recesses are designed on the prop card for connection between the two. To increase the fun of the game, preferably, the protrusions on the character card can be designed to be just the hands or feet of the character, and the prop card is designed to be the corresponding prop that can be worn on the hands or feet, such as a weapon, shoe, or a horse. Of course, it should be understood that any shape-matching form that enables the character card and the prop card to be detachably connected together is feasible within the spirit and scope of this application.

Skills are also "equipped" on the character. Therefore, in order to reflect the relationship between the skill and the character, in a preferred embodiment of this application, the character card and the skill card are designed to be detachably connected together in a shape-matching form. This can refer to the design of the character card and the prop card described above. In addition, the skill is often considered to be an internal element of the character, compared to the prop. Therefore, in some preferred embodiments, a mini-card with the name of the skill may also be set in the character, such that the mini-card of the skill is embedded in the character card in a detachably replaceable manner. Preferably, this embedding may be in the form of a bounding or semi-bounding form.

It should be understood that although the concept of a "board" is used in this application to describe the rule and map boards of the programmable cards of this application, this is only to illustrate that these boards are mainly two-dimensional, but also has a certain thickness and hardness, they may also have other forms, for example three-dimensional structure with obvious thickness or a thin "paper" form without significant thickness. Within the spirit and scope of this application, these forms are essentially the same as the "board" form of this application.

It should also be understood that in this application, these replaceable components, including but not limited to a replaceable basic rule sub-board, a condition portion, an execution portion, and a loop portion of a replaceable basic rule sub-board, a condition portion, an execution portion, a loop portion, a foreshadowing portion, and a card frame of a replaceable game card, a parameter portion, a value portion, a skill portion of a replaceable game card, and even the game card itself, may be designed as blank, so that the game player may design the game based on their own creativity.

It will be understood by those technicians in the art that changes may be made to the embodiments described above without departing from the broad general description thereof. It is therefore to be understood that this application disclosed herein is not limited to the particular embodiments disclosed, but is intended to cover all variations within the spirit and scope of this application as defined by the appended claims. In addition, even if the spirit and scope of this application as defined by the appended claims are interpreted according to the embodiments disclosed in this application, the principle of donation should not be applied to the spirit and scope of the present application unless specifically stated by the applicant.

What is claimed is:

1. A programmable gaming card, comprising:
a basic rule board,
and one or more different types of game cards,
wherein the basic rule board comprises a basic rule mainboard and a plurality of basic rule sub-boards, wherein the plurality of the basic rule sub-boards are detachably connected to the basic rule mainboard in a shape-matching manner, and each of the basic rule sub-boards records a rule of the game;
wherein the one or more different types of game cards comprise event cards, the event card comprises a direct execution event card, a conditional execution event card, and/or a loop execution event card;
wherein the direct execution event card comprises an execution portion, the execution portion that describes an action to be executed;
wherein the conditional execution event card comprises a condition portion and the execution portion, and the condition portion and the execution portion are designed to be detachably connected together in a shape-matching manner, the condition portion that describes a condition for executing an action;

wherein the loop execution event card comprises a loop portion and the execution portion, and the loop portion and the execution portion are designed to be detachably connected together in a shape-matching manner, the loop portion that describes the number of times or a condition for executing an action in the loop.

2. The programmable gaming card of claim 1, wherein the direct execution event card further comprises a foreshadowing portion, and the foreshadowing portion that uses more words to describe the event, or develop a storyline to increase the fun of the game; wherein the foreshadowing portion is designed integrally with the execution portion, or is designed to be detachably connected together in a shape-matching manner;

wherein the condition portion is designed with an outwardly convex arrow shape, and the execution portion is designed with a concave portion matching the arrow shape, thereby connecting the two portions together; and/or the loop portion is designed as a bounding or semi-bounding box, and the execution portion is designed as a card that can be embedded in the box.

3. The programmable gaming card of claim 2, wherein the execution portion is designed to be divided into upper and lower portions, if the condition is achieved, the upper portion will be executed, and if not achieved, the lower portion will be executed, and the upper portion and lower portion are respectively engaged to the two sides of the arrow of the condition portion.

4. The programmable gaming card of claim 1, wherein the one or more different types of game cards further comprise a character card, and the character card comprises a character main portion, at least one parameter portion describing a parameter of the game, and at least one value portion describing a parameter value, both the parameter portion and the value portion being designed to be detachably embedded in the character card.

5. The programmable gaming card of claim 4, wherein the one or more different types of game cards further comprise a prop card, and the prop card comprises a prop main portion, the at least one parameter portion describing a parameter of the game, and the at least one value portion describing a parameter value, both the parameter portion and the value portion being designed to be detachably embedded in the prop card.

6. The programmable gaming card of claim 5, wherein at least one protrusion is designed on the character card, and a recess matching the protrusion is designed on the prop card for connection of the character card to the prop card; wherein at least one of the protrusion of the character card may be designed as a hand or a foot of the character, and the corresponding prop card is designed as a prop matching the hand or foot.

7. A programmatic gaming card of claim 4, wherein the one or more different types of game cards further comprise a skill card, and the skill card comprises a skill main portion, at least one the parameter portion describing a parameter of the game, and at least one the value portion describing a parameter value, both the parameter portion and the value portion being designed to be detachably embedded in the skill card.

8. The programmable gaming card of claim 7, wherein the skill card further comprises the condition portion and the execution portion, the condition portion and the execution portion being designed to be detachably connected together in a shape-matching manner.

9. The programmable gaming card of claim 8, wherein the character card and the skill card are designed to be detachably connected together in a shape-matching manner, and a skill mini-card with the name of the skill may also be set in the character card, and the skill mini-card is embedded in the character card in a detachable and replaceable manner.

10. The programmable gaming card of claim 4, wherein the parameter portion is designed in the form of a parameter mini-card, and is embedded in the one or more different types of game cards in a detachable and replaceable manner; and/or the value portion is designed in the form of a value mini-card, and is embedded in the one or more different types of game cards in a detachable and replaceable manner.

\* \* \* \* \*